US012730980B2

(12) United States Patent
Zhou et al.

(10) Patent No.: US 12,730,980 B2
(45) Date of Patent: Sep. 8, 2026

(54) REAL-TIME ADAPTATION OF MACHINE LEARNING MODELS USING LARGE LANGUAGE MODELS

(71) Applicant: SAP SE, Walldorf (DE)

(72) Inventors: Yi Quan Zhou, Singapore (SG); Prawira Putra Fadjar, Singapore (SG); Bee Huang Tan, Singapore (SG); Kham Sian Mung, Singapore (SG); Jing Li, Singapore (SG)

(73) Assignee: SAP SE, Walldorf (DE)

( * ) Notice: Subject to any disclaimer, the term of this patent is extended or adjusted under 35 U.S.C. 154(b) by 227 days.

(21) Appl. No.: 18/508,428

(22) Filed: Nov. 14, 2023

(65) Prior Publication Data

US 2025/0156652 A1 May 15, 2025

(51) Int. Cl.
*G06F 40/40* (2020.01)
*G06F 11/34* (2006.01)

(52) U.S. Cl.
CPC .......... *G06F 40/40* (2020.01); *G06F 11/3428* (2013.01)

(58) Field of Classification Search
CPC ................................................... G06F 11/3428
See application file for complete search history.

(56) References Cited

U.S. PATENT DOCUMENTS 9,489,289 B2 11/2016 Hu et al.
9,952,835 B2 4/2018 Wang et al.
11,281,989 B2 3/2022 Dahlmeier et al.
11,663,527 B1 * 5/2023 Lopatecki .............. G06N 20/00 706/12
12,218,890 B2 * 2/2025 Abraham ................ H04L 51/04
2022/0164325 A1 * 5/2022 He ........................ G06F 16/221
2023/0214456 A1 7/2023 Gullapudi et al.
2023/0259705 A1 * 8/2023 Tunstall-Pedoe .... G06N 3/0499 704/9
2023/0280983 A1 9/2023 Zang et al.
2024/0296279 A1 * 9/2024 Gardner ................ G06F 40/169
2024/0378394 A1 * 11/2024 Kotikalapudi .......... G06F 40/40

(Continued)

OTHER PUBLICATIONS

Li et al. "Deep Entity Matching with Pre-Trained Language Models". arXiv:2004.00584v3 [cs.DB] Sep. 2, 2020 (Year: 2020).*

(Continued)

*Primary Examiner* — Jesse S Pullias
(74) *Attorney, Agent, or Firm* — Fish & Richardson P.C.

(57) ABSTRACT

Methods, systems, and computer-readable storage media for generating a detection prompt at least partially based on unstructured data determined from one or more of a query entity and a target entity, determining an unstructured data pattern vector that is representative of an output of a LLM that is responsive to the detection prompt, providing a data pattern metric based on the unstructured data pattern vector, generating an explanation prompt at least partially based on the inference result, determining a correctness result that is representative of a correctness of the inference result using explanation text that is generated by the LLM, in response to determining that there is a threshold decrease in accuracy at least partially based on the correctness result, automatically executing one of fine-tuning of the ML model and re-training of the ML model to provide an adapted ML model.

20 Claims, 6 Drawing Sheets

(56) References Cited

U.S. PATENT DOCUMENTS

2024/0427810 A1* 12/2024 Tishbi ................. G06F 16/3344
2024/0428015 A1* 12/2024 Yoon ....................... G06F 40/40

OTHER PUBLICATIONS

Choi et al. “Deep learning for patent landscaping using transformer and graph embedding”. Technological Forecasting & Social Change 175 (2022) 121413 (Year: 2022).*
Madaan et al. “DetAIL : A Tool to Automatically Detect and Analyze Drift in Language”. arXiv:2211.04250v1 [cs.LG] Nov. 3, 2022 (Year: 2022).*
U.S. Appl. No. 17/830,598, filed Jun. 2, 2022, Zhou et al.
U.S. Appl. No. 17/839,787, filed Jun. 14, 2022, Zhou et al.
U.S. Appl. No. 18/358,225, filed Jul. 25, 2023, Arumugam et al.
U.S. Appl. No. 18/358,245, filed Jul. 25, 2023, Arumugam et al.
U.S. Appl. No. 18/454,905, filed Aug. 24, 2023, Zhou.
U.S. Appl. No. 18/455,775, filed Aug. 25, 2023, Frank et al.
U.S. Appl. No. 18/463,519, filed Sep. 8, 2023, Zhou et al.
U.S. Appl. No. 18/480,635, filed Oct. 4, 2023, Arumugam et al.

* cited by examiner

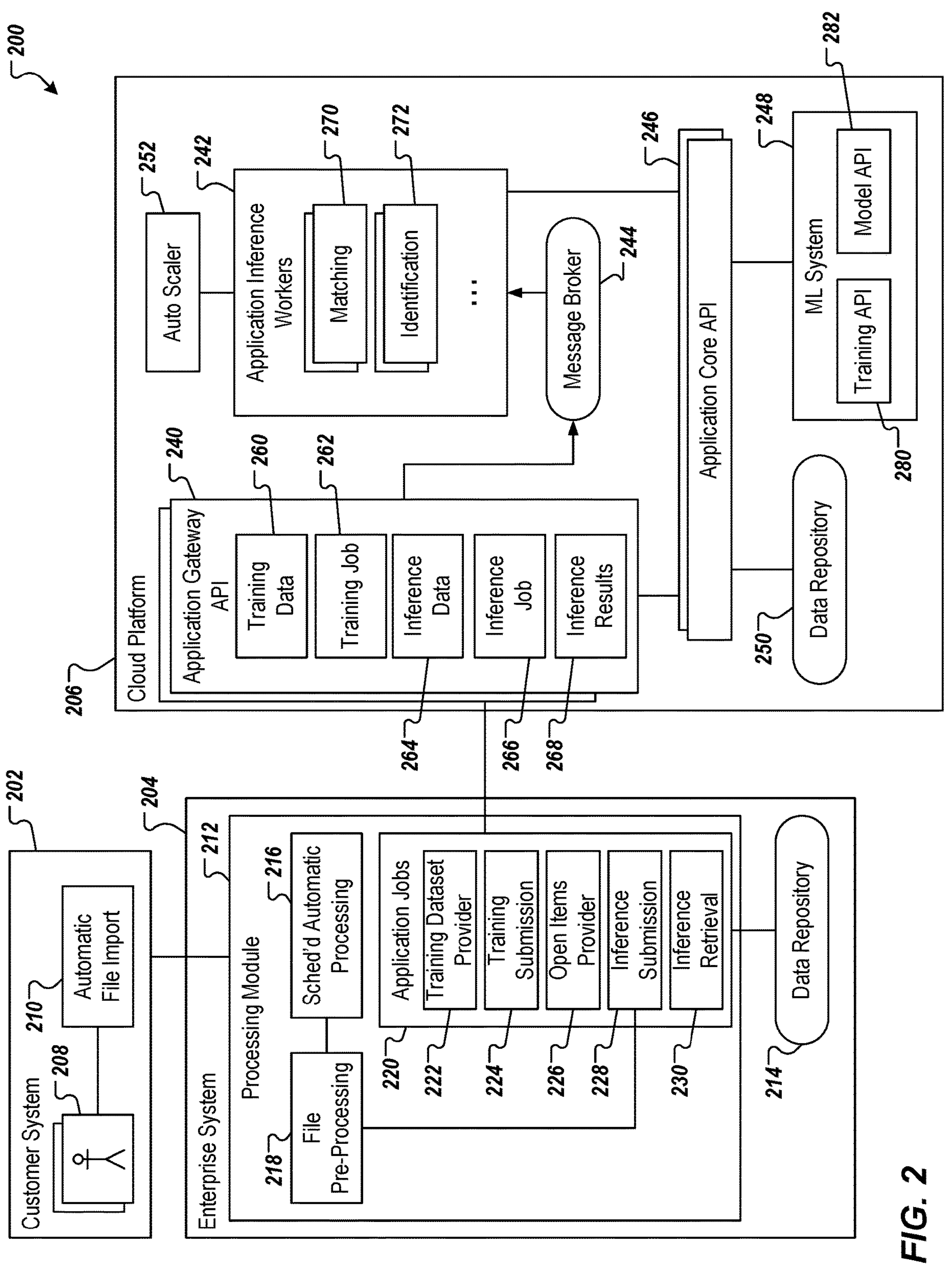
200
Customer System
202
208
210
Automatic File Import
Enterprise System
204
Processing Module
212
Sched'd Automatic Processing
216
File Pre-Processing
218
Application Jobs
220
Training Dataset Provider
222
Training Submission
224
Open Items Provider
226
Inference Submission
228
Inference Retrieval
230
Data Repository
214
Cloud Platform
206
Application Gateway API
240
Training Data
260
Training Job
262
Inference Data
264
Inference Job
266
Inference Results
268
Auto Scaler
252
Application Inference Workers
242
Matching
270
Identification
272
Message Broker
244
Application Core API
246
ML System
248
Training API
280
Model API
282
Data Repository
250
FIG. 2

| Bank Statement ID | Company Code | Amount | Currency | Partner Name | Note |
|---|---|---|---|---|---|
| 1000 | CC1 | 990 | EUR | ACME | 1000789 |
| 2000 | CC2 | 2000 | USD | | 90011 876, 895 REF Soylent |
| ... | ... | ... | ... | ... | ... |

| Document # | Company Code | Amount | Currency | Organization |
|---|---|---|---|---|
| 10000789 | CC1 | 1000 | EUR | ACME |
| 90011876 | CC2 | 1200 | USD | Soylent |
| 90011898 | CC2 | 800 | USD | Soylent |
| 10000790 | CC1 | 1100 | EUR | ACME |
| ... | ... | ... | ... | ... |

REAL-TIME ADAPTATION OF MACHINE LEARNING MODELS USING LARGE LANGUAGE MODELS

BACKGROUND

Enterprises continuously seek to improve and gain efficiencies in their operations. To this end, enterprises employ software systems to support execution of operations. Recently, enterprises have embarked on the journey of so-called intelligent enterprise, which includes automating tasks executed in support of enterprise operations using machine learning (ML) systems. For example, one or more ML models are each trained to perform some task based on training data. Trained ML models are deployed, each receiving input (e.g., a computer-readable document) and providing output (e.g., classification of the computer-readable document) in execution of a task (e.g., document classification task). ML systems can be used in a variety of problem spaces. An example problem space includes autonomous systems that are tasked with matching items of one entity to items of another entity. Examples include, without limitation, matching questions to answers, people to products, bank statements to invoices, and bank statements to customer accounts.

SUMMARY

Implementations of the present disclosure are directed to a machine learning (ML) system for matching a query entity to one or more target entities. More particularly, implementations of the present disclosure are directed to monitoring performance of a ML model and selectively adapting the ML model using a large language model (LLM).

In some implementations, actions include receiving a query entity and a target entity pair that are input to the ML model, receiving an inference result output from the ML model for the query entity and the target entity pair, generating a detection prompt at least partially based on unstructured data determined from one or more of the query entity and the target entity, determining an unstructured data pattern vector that is representative of an output of a LLM that is responsive to the detection prompt, providing a data pattern metric based on the unstructured data pattern vector, generating an explanation prompt at least partially based on the inference result, determining a correctness result that is representative of a correctness of the inference result using explanation text that is generated by the LLM and is responsive to the explanation prompt, in response to determining that there is a threshold decrease in accuracy at least partially based on the correctness result, automatically executing one of fine-tuning of the ML model and re-training of the ML model responsive to the data pattern metric to provide an adapted ML model, and deploying the adapted ML model for inference. Other implementations of this aspect include corresponding systems, apparatus, and computer programs, configured to perform the actions of the methods, encoded on computer storage devices.

These and other implementations can each optionally include one or more of the following features: fine-tuning of the ML model is triggered in response to determining that there is a sufficient data pattern change based on the data pattern metric; re-training of the ML model is triggered in response to determining that there is not a sufficient data pattern change based on the data pattern metric; providing a data pattern metric includes comparing the unstructured data pattern vector to an existing unstructured data pattern vector; determining that there is a threshold decrease in accuracy includes determining an accuracy based on the correctness result and historical correctness results, and comparing the accuracy to a benchmark accuracy; each of the detection prompt and the explanation prompt is provided as a few-shot prompt; and fine-tuning is performed using a sub-set of query entity and target entity pairs previously used for inference, and re-training is performed using an entirety of query entity and target entity pairs previously used for inference.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 2 depicts an example conceptual architecture in accordance with implementations of the present disclosure.

Like reference symbols in the various drawings indicate like elements.

DETAILED DESCRIPTION

Figure 1:
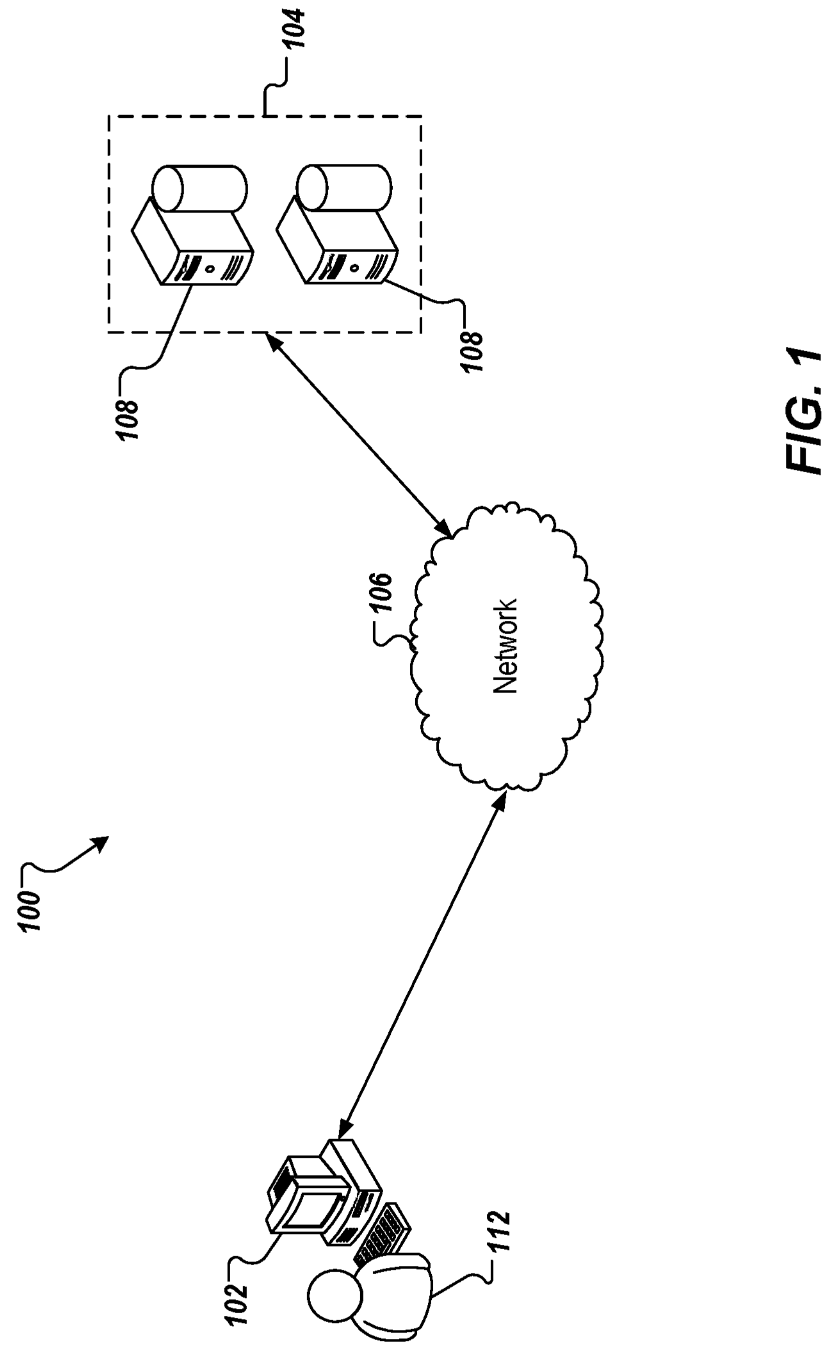
FIG. 1 depicts an example architecture that can be used to execute implementations of the present disclosure.

Implementations of the present disclosure are directed to a machine learning (ML) system for matching a query entity to one or more target entities. More particularly, implementations of the present disclosure are directed to monitoring performance of a ML model and selectively adapting the ML model using a large language model (LLM). As described in further detail herein, a data pattern change and an accuracy of the ML model are evaluated in real-time to determine whether to selectively re-train the ML model or fine-tune the ML model.

Implementations can include actions of receiving a query entity and a target entity pair that are input to the ML model, receiving an inference result output from the ML model for the query entity and the target entity pair, generating a detection prompt at least partially based on unstructured data determined from one or more of the query entity and the target entity, determining an unstructured data pattern vector that is representative of an output of a LLM that is responsive to the detection prompt, providing a data pattern metric based on the unstructured data pattern vector, generating an explanation prompt at least partially based on the inference result, determining a correctness result that is representative of a correctness of the inference result using explanation text that is generated by the LLM and is responsive to the explanation prompt, in response to determining that there is a threshold decrease in accuracy at least partially based on the correctness result, automatically executing one of fine-tuning of the ML model and re-training of the ML model responsive to the data pattern metric to provide an adapted ML model, and deploying the adapted ML model for inference.

To provide context for implementations of the present disclosure, enterprises continuously seek to improve and gain efficiencies in their operations. To this end, enterprises employ software systems to support execution of operations. Recently, enterprises have embarked on the journey of so-called intelligent enterprise, which includes automating tasks executed in support of enterprise operations using ML systems. For example, one or more ML models are each trained to perform some task based on training data. Trained ML models are deployed, each receiving input (e.g., a computer-readable document) and providing output (e.g., classification of the computer-readable document) in execution of a task (e.g., document classification task). ML systems can be used in a variety of problem spaces. An example problem space includes autonomous systems that are tasked with matching items of one entity to items of another entity. Examples include, without limitation, matching questions to answers, people to products, bank statements to invoices, and bank statements to customer accounts.

The problem of matching entities represented by computer-readable records (electronic documents) appears in many contexts. Example contexts can include matching product catalogs, deduplicating a materials database, and matching incoming payments from a bank statement table to open invoices. Implementations of the present disclosure are described in further detail with reference to an example problem space that includes the domain of finance and matching bank statements to invoices. More particularly, implementations of the present disclosure are described with reference to the problem of, given a bank statement (e.g., a computer-readable electronic document recording data representative of a bank statement), enabling an autonomous system using a ML model to determine one or more invoices (e.g., computer-readable electronic documents recording data representative of one or more invoices) that are represented in the bank statement. It is contemplated, however, that implementations of the present disclosure can be realized in any appropriate problem space.

Technologies related to artificial intelligence (AI) and ML, AI and ML being used interchangeably herein, have been widely applied in various fields. For example, ML-based decision systems can be used to make decisions on subsequent tasks. With reference to the example context, an ML-based decision system can be used to determine matches between bank statements and invoices. For example, invoices can be cleared in an accounting system by matching invoices to one or more line items in bank statements. In other contexts, decisions on treatment courses of patients (e.g., prescribe/not prescribe a drug) and/or decisions on whether to approve customers for loans can be made based on output of ML-based decision systems. In general, an output of a ML-based decision system can be referred to as a prediction or an inference result.

However, the use of ML model in decision systems present unique challenges that did not previously exist in the pre-ML world. One challenge is that, robustness of ML models deteriorates over time. More particularly, if data patterns change over time and drift from data patterns when the ML model was trained, the ML model suffers a performance drop. In real-world scenarios, changes in data patterns are common. When this situation occurs, traditional approaches re-train the ML model with training data that accounts for new data patterns. However, in real-world scenarios, it is a non-trivial task to evaluate ML model performance in real-time in an automated way. For example, the traditional metric, confidence level, of a ML model can still be high even though the inference results are increasingly error prone. This can lead to many issues that require resource consumption to rectify. For example, if a task is automatically performed in response to an incorrect inference result, resources have to be consumed to rollback the task, and any further downstream tasks, or otherwise mitigate results of the incorrect inference.

In view of the above context, implementations of the present disclosure provide a real-time ML model adaptation mechanism that can detect data pattern changes and evaluate performance quality of ML models using LLMs. In response to a data pattern change reduced performance of a ML model, a re-training or fine-tuning of the ML model is automatically triggered to provide a new or updated ML model to account for the changed data pattern and improve performance of the ML-based decision system.

Implementations of the present disclosure are described in further detail herein with reference to an example application that leverages one or more ML models to provide functionality (referred to herein as a ML application). The example application includes SAP Cash Application (CashApp) provided by SAP SE of Walldorf, Germany. CashApp leverages ML models that are trained using a ML framework (e.g., SAP AI Core) to learn accounting activities and to capture rich detail of customer and country-specific behavior. An example accounting activity can include matching payments indicated in a bank statement to invoices for clearing of the invoices. For example, using an enterprise platform (e.g., SAP S/4 HANA), incoming payment information (e.g., recorded in computer-readable bank statements) and open invoice information are passed to a matching engine, and, during inference, one or more ML models predict matches between records of a bank statement and invoices. In some examples, matched invoices are either automatically cleared (auto-clearing) or suggested for review by a user (e.g., accounts receivable). Although CashApp is referred to herein for purposes of illustrating implementations of the present disclosure, it is contemplated that implementations of the present disclosure can be realized with any appropriate application that leverages one or more ML models.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host a ML-based decision system that predicts matches between entities (e.g., CashApp, referenced by way of example herein). In some examples, the ML-based decision system can include or interact with a real-time ML model adaptation mechanism of the present disclosure. Also, in accordance with implementations of the present disclosure, the server system 104 can host one or more LLMs that the real-time ML model adaptation mechanism interacts with to support detection of data pattern changes and degradation of ML model performance.

FIG. 2 depicts an example conceptual architecture 200 in accordance with implementations of the present disclosure. In the depicted example, the conceptual architecture 200 includes a customer system 202, an enterprise system 204 (e.g., SAP S/4 HANA) and a cloud platform 206 (e.g., SAP Cloud Platform (Cloud Foundry)). As described in further detail herein, the enterprise system 204 and the cloud platform 206 facilitate one or more ML applications that leverage ML models to provide functionality for one or more enterprises. In some examples, each enterprise interacts with the ML application(s) through a respective customer system 202. For purposes of illustration, and without limitation, the conceptual architecture 200 is discussed in further detail with reference to CashApp, introduced above. However, implementations of the present disclosure can be realized with any appropriate ML application.

In the example of FIG. 2, the customer system 202 includes one or more client devices 208 and a file import module 210. In some examples, a user (e.g., an employee of the customer) interacts with a client device 208 to import one or more data files to the enterprise system 204 for processing by a ML application. For example, and in the context of CashApp, an invoice data file and a bank statement data file can be imported to the enterprise system 204 from the customer system 202. In some examples, the invoice data file includes data representative of one or more invoices issued by the customer, and the bank statement data file includes data representative of one or more payments received by the customer. As another example, the one or more data files can include training data files that provide customer-specific training data for training of one or more ML models for the customer.

In the example of FIG. 2, the enterprise system 204 includes a processing module 212 and a data repository 214. In the context of CashApp, the processing module 212 can include a finance-accounts receivable module. The processing module 212 includes a scheduled automatic processing module 216, a file pre-processing module 218, and an applications job module 220. In some examples, the scheduled automatic processing module 216 receives data files from the customer system 202 and schedules the data files for processing in one or more application jobs. The data files are pre-processed by the file pre-processing module 218 for consumption by the processing module 212.

Example application jobs can include, without limitation, training jobs and inference jobs. In some examples, a training job includes training of a ML model using a training file (e.g., that records customer-specific training data). In some examples, an inference job includes using a ML model to provide a prediction, also referred to herein as an inference result. In the context of CashApp, the training data can include invoice to bank statement matches as examples provided by a customer, which training data is used to train a ML model to predict invoice to bank statement matches. Also in the context of CashApp, the data files can include an invoice data file and a bank statement data file that are ingested by a ML model to predict matches between invoices and bank statements in an inference process.

With continued reference to FIG. 2, the application jobs module 220 includes a training dataset provider sub-module 222, a training submission sub-module 224, an open items provider sub-module 226, an inference submission sub-module 228, and an inference retrieval sub-module 230. In some examples, for a training job, the training dataset provider sub-module 222 and the training submission sub-module 224 function to request a training job from and provide training data to the cloud platform 206. In some examples, for an inference job, the training dataset provider sub-module 222 and the training submission sub-module 224 function to request a training job from and provide training data to the cloud platform 206.

In some implementations, the cloud platform 206 hosts at least a portion of the ML application (e.g., CashApp) to execute one or more jobs (e.g., training job, inference job). In the example of FIG. 2, the cloud platform 206 includes one or more application gateway application programming interfaces (APIs) 240, application inference workers 242 (e.g., matching worker 270, identification worker 272), a message broker 244, one or more application core APIs 246, a ML system 248, a data repository 250, and an auto-scaler 252. In some examples, the application gateway API 240 receives job requests from and provides job results to the enterprise system 204 (e.g., over a REST/HTTP [oAuth] connection). For example, the application gateway API 240 can receive training data 260 for a training job 262 that is executed by the ML system 248. As another example, the application gateway API 240 can receive inference data 264 (e.g., invoice data, bank statement data) for an inference job 266 that is executed by the application inference workers 242, which provide inference results 268 (e.g., predictions).

In some examples, the enterprise system 204 can request the training job 262 to train one or more ML models using the training data 260. In response, the application gateway API 240 sends a training request to the ML system 248 through the application core API 246. By way of non-limiting example, the ML system 248 can be provided as SAP AI Core. In the depicted example, the ML system 248 includes a training API 280 and a model API 282. The ML system 248 trains a ML model using the training data. In some examples, the ML model is accessible for inference jobs through the model API 282.

In some examples, the enterprise system 204 can request the inference job 266 to provide the inference results 268, which includes a set of predictions from one or more ML models. In some examples, the application gateway API 240 sends an inference request, including the inference data 264, to the application inference workers 242 through the message broker 244. An appropriate inference worker of the application inference workers 242 handles the inference request. In the example context of matching invoices to bank statements, the matching worker 270 transmits an inference request to the ML system 248 through the application core API 246. The ML system 248 accesses the appropriate ML model (e.g., the ML model that is specific to the customer and that is used for matching invoices to bank statements), which generates the set of predictions. The set of predictions are provided back to the inference worker (e.g., the matching worker 270) and are provided back to the enterprise system 204 through the application gateway API 240 as the inference results 268. In some examples, the auto-scaler 252 functions to scale the inference workers up/down depending on the number of inference jobs submitted to the cloud platform 206.

Figure 3:
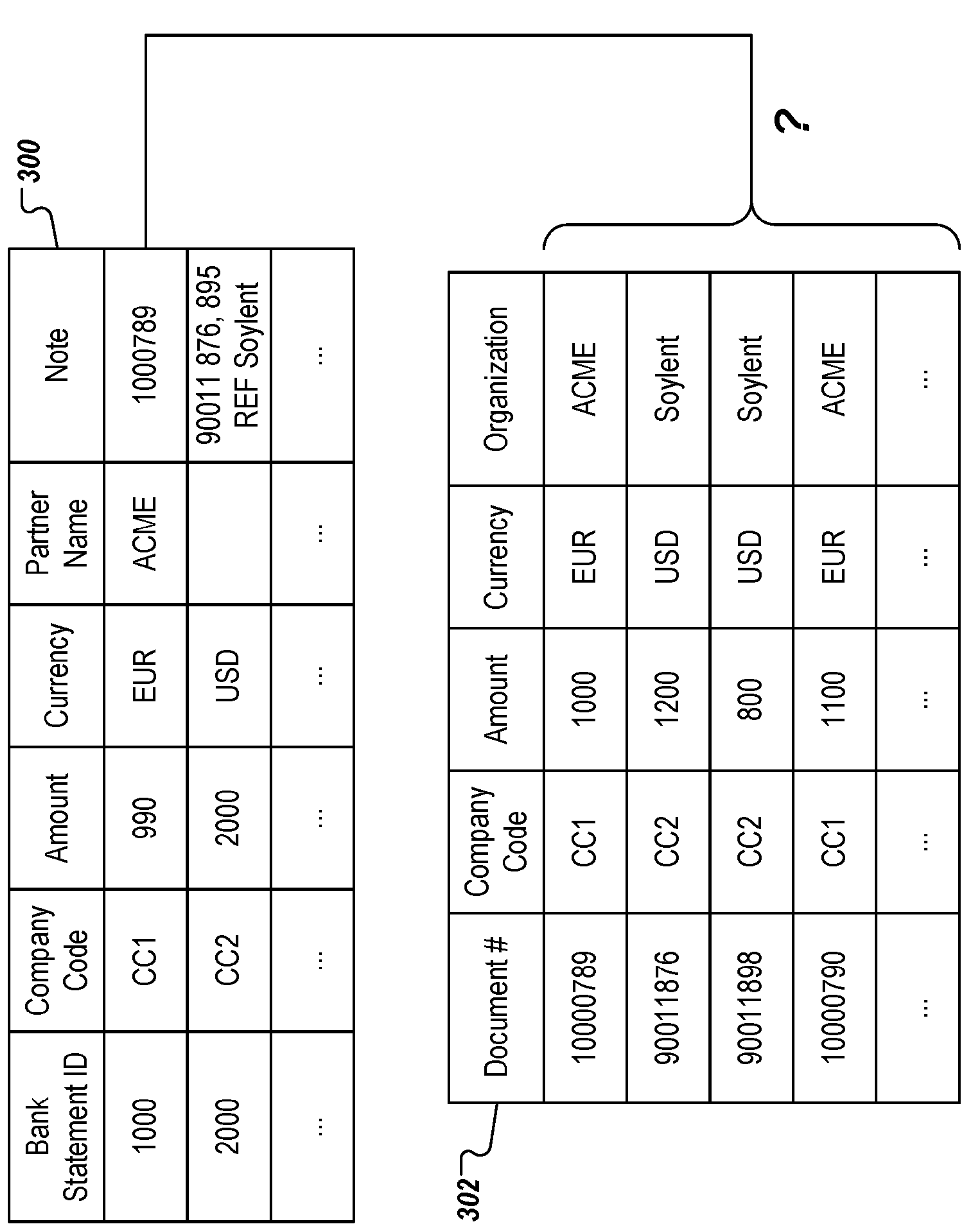
FIG. 3 depicts portions of example electronic documents.

In the example context, FIG. 3 depicts portions of example electronic documents. In the example of FIG. 3, a first electronic document 300 includes a bank statement table that includes records representing payments received, and a second electronic document 302 includes an invoice table that includes invoice records respectively representing invoices that had been issued. In the example context, each bank statement record is to be matched to one or more invoice records. Accordingly, the first electronic document 300 and the second electronic document 302 are processed using one or more ML models that provide predictions regarding matches between a bank statement record (entity) and one or more invoice records (entity/-ies) (e.g., using CashApp, as described above).

To achieve this, a ML model (matching model) is provided as a classifier that is trained to predict entity pairs to a fixed set of class labels ($\vec{l}$) (e.g., $l_0$, $l_1$, $l_2$). For example, the set of class labels ($\vec{l}$) can include 'no match' ($l_0$), 'single match' ($l_1$), and 'multi match' ($l_2$). In some examples, the ML model is provided as a function $f$ that maps a query entity ($\vec{a}$) and a target entity ($\vec{b}$) into a vector of probabilities ($\vec{p}$) (also called 'confidences' in the deep learning context) for the labels in the set of class labels. This can be represented as:

$$f(\vec{a}, \vec{b}) = \begin{pmatrix} p_0 \\ p_1 \\ p_2 \end{pmatrix}$$

where $\vec{p}=\{p_0, p_1, p_2\}$. In some examples, $p_0$ is a prediction probability (also referred to herein as confidence c) of the item pair $\vec{a}$, $\vec{b}$ belonging to a first class (e.g., no match), $p_1$ is a prediction probability of the item pair $\vec{a}$, $\vec{b}$ belonging to a second class (e.g., single match), and $p_2$ is a prediction probability of the item pair $\vec{a}$, $\vec{b}$ belonging to a third class (e.g., multi match).

Here, $p_0$, $p_1$, and $p_2$ can be provided as numerical values indicating a likelihood (confidence) that the item pair $\vec{a}$, $\vec{b}$ belongs to a respective class. In some examples, the ML model can assign a class to the item pair $\vec{a}$, $\vec{b}$ based on the values of $p_0$, $p_1$, and $p_2$. In some examples, the ML model can assign the class corresponding to the highest value of $p_0$, $p_1$, and $p_2$. For example, for an entity pair $\vec{a}$, $\vec{b}$, the ML model can provide that $p_0$=0.13, $p_1$=0.98, and $p_2$=0.07. Consequently, the ML model can assign the class 'single match' ($l_1$) to the item pair $\vec{a}$, $\vec{b}$.

As introduced above, implementations of the present disclosure include a real-time ML model adaptation mechanism that can detect data pattern changes and evaluate performance quality of ML models using LLMs. As used herein, real-time refers to actions that are performed without intentional delay (e.g., not accounting for delay in processing, communication, and the like). As also used herein, automatic refers to actions that are automatically performed in response to one or more conditions precedent without requiring human intervention. In some implementations, inference data (e.g., a query entity and target entity pair) is stored and used for inference, as well as performance evaluation and selective re-train. Data pattern detection is used to monitor and evaluate whether a data pattern seen in the inference data changes over time and, if so, to what degree. If a change in data pattern is discovered, inference accuracy data is retrieved to determine an accuracy of the ML model. The accuracy can be compared to historical data of the ML model to determine whether performance of the ML model has dropped by at least a threshold. If the performance has so fallen, re-training or fine-tuning of the ML model is automatically triggered.

As also described in further detail herein, a LLM is used to determine accuracy and data pattern changes. Example LLMs can include, but are not limited to, ChatGPT and Bard. In general, a LLM can be described as a form of generative AI (GAI) that can be used to generate text for a variety of use cases. More particularly, and as described in further detail herein, the LLM can receive a prompt, and processes the prompt to generate a response.

Figure 4:
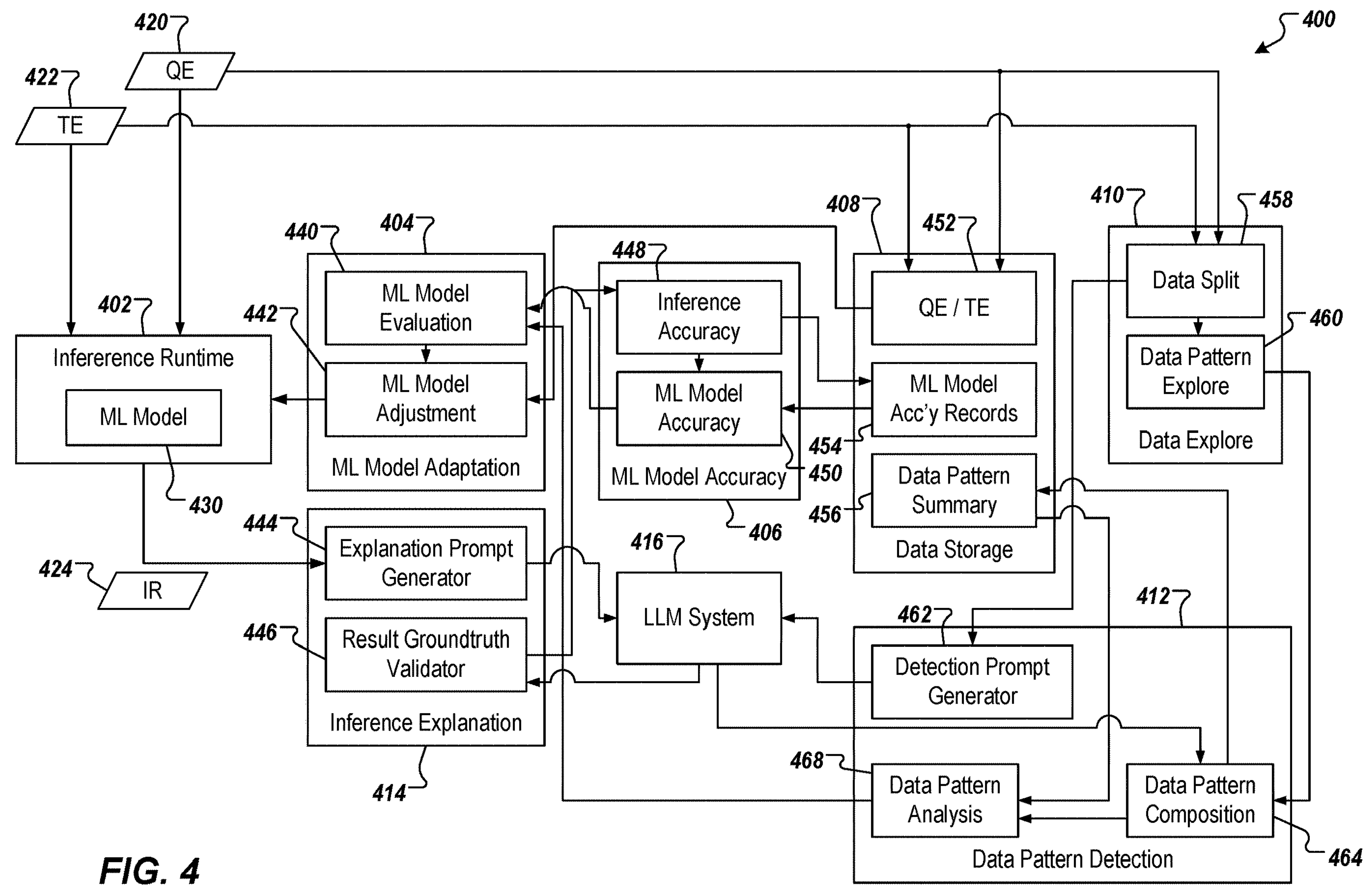
FIG. 4 depicts an example conceptual architecture in accordance with implementations of the present disclosure.

FIG. 4 depicts an example conceptual architecture 400 in accordance with implementations of the present disclosure. In the example of FIG. 4, the conceptual architecture 400 can be representative of at least a portion of a ML model deployment platform and includes an inference runtime 402, a ML model adaptation system 404, a ML model accuracy system 406, a data storage system 408, a data exploration system 410, a data pattern detection system 412, an inference explanation system 414, and a LLM system 416.

In some examples, the inference system receives a query entity 420 and a target entity 422 and generates an inference result 424. For example, the inference system 402 executes a ML model 430 that determines the inference result 424 based on the query entity 420 and the target entity 422. In the context of the present disclosure, the inference result 424 can represent a type of match (e.g., no, single, multiple) between the query entity 420 and the target entity 422. Further, the query entity 420 and/or the target entity 422 can include one or more data fields that are populated with structured data (e.g., categories) and one or more data fields that are populated with unstructured data (e.g., text sentence data). As such, each can be referred to as semi-structured. Examples of unstructured data include, but are not limited to, remarks and memos.

In the example of FIG. 4, the ML model adaptation system 404 includes a ML model evaluation module 440 and a ML model adjustment module 442. The inference explanation system 414 includes an explanation prompt generator 444 and a result groundtruth validator 446. The ML model accuracy system 406 includes an inference accuracy module 448 and a ML model accuracy module 450. The data storage system 408 includes a query entity and target entity store 452, a ML model accuracy records store 454, and a data pattern summary store 456. The data exploration system 410 includes a data split module 458 and a data pattern exploration module 460. The data pattern detection system 412 includes a detection prompt generator 462, a data pattern composition module 464, and a data pattern analysis module 468.

In accordance with implementations of the present disclosure, each query entity and target entity pair (e.g., the query entity 420, the target entity 422) is stored as inference data in the query entity and target entity store 452 of the data storage system 408. The data recorded in each of the query entity 420 and the target entity 422 are split into structured data and unstructured data by the data split module 458 of the data exploration system 410. The structured data is processed by the data pattern exploration module 460 to generate a data pattern vector (also referred to as a data pattern embedding). In some examples, the structured data includes structured data of both the query entity 420 and the target entity 422. In some examples, the data pattern vector is provided as a multi-dimensional vector of numbers that represent a data pattern of the structured data. In some examples, the data pattern vector is generated by processing the structured data through an embedder that outputs the data pattern vector. As discussed in further detail herein, the data pattern vector is processed by the data pattern composition module 464 to generate summary to be stored.

In accordance with implementations of the present disclosure, the unstructured data is used to generate context for a detection prompt by the detection prompt generator 462 of the data pattern detection system 412, as described in further detail herein. In some examples, the unstructured data includes unstructured data of both the query entity 420 and the target entity 422. The detection prompt can be described as a few-shot prompt that is input to the LLM system 416, which processes the detection prompt to abstract data attributes from the unstructured data. Here, providing context in a few-shot prompt can be referred to as few-shot learning. In natural language processing (NLP), few-shot learning (also referred to as in-context learning and/or few-shot prompting) is a prompting technique that enables a LLM to process examples before attempting a task. In the context of the present disclosure, the task includes abstracting attributes of the unstructured data.

In some implementations, the LLM system 416 processes the detection prompt and generates an output that is responsive to the detection prompt. A non-limiting example prompt is provided in Listing 1.

Listing 1: Example Detection Prompt

```
context = f"""
In the data content of table 1 and table 2: {table1} and
{table2}
"""
user_prompt = f"""
In below memo: {memoline} \n
identify any properties matched in array:
{field_names_open_invoices}. output the values of the matched
properties in JSON format.
"""
prompt = [{"role": "system", "content": context}, {"role":
"user", "content": user_prompt}]
response = get_completion(prompt)
```

The output of the LLM system 416 is processed by the data pattern composition module 464 to provide a data pattern vector. For example, the output of the LLM system 416 is response to the example detection prompt of Listing 1 would include properties of an array that are determined to match, the properties being provided in Javascript object notation (JSON). This output can be processed by an embedder, for example, to provide the data pattern vector.

In some examples, the data pattern vector is provided as a multi-dimensional vector of numbers that represent a data pattern of the data. The data pattern vector can be stored in the data pattern summary store 456. In some examples, a summary data pattern vector is retrieved from the data pattern summary store 456 and the data pattern analysis module 468 compares the summary data pattern vector with the data pattern vector to provide a data pattern change, which can be considered a data pattern metric. The data pattern change is input to the ML model adaptation system 404. In some examples, the comparison can include a dot product to determine a degree of difference between the summary data pattern vector and the data pattern vector.

In accordance with implementations of the present disclosure, the inference result 424 provided by the inference runtime 402 is used as context to generate an explanation prompt by the explanation prompt generator 444, as described in further detail herein. The explanation prompt can be described as a few-shot prompt that is input to the LLM system 416, which processes the explanation prompt to generate explanation text. Listing 2 provides a non-limiting example explanation prompt.

Listing 2: Example Explanation Prompt

```
context = f"""
Payment from {BUSINESSPARTNERNAME} for document
{DOCUMENTREFERENCEID} and payment reference {PAYMENT
REFERENCE} of amount {AMOUNTTRANSACTIONCURRENCY} with customer
comments {MEMOLINE} \
matches with the following invoices: \
{index}. Invoice from {ORGANIZATIONBPNAME1} {ORGANIZATION
BPNAME2} with debtor {DEBTOR} of amount {AMOUNTTRANSACTION
```

-continued

Listing 2: Example Explanation Prompt

```
CURRENCY} with payment reference {PAYMENTREFERENCE} and
assignment reference {ASSIGNMENTREFERENCE} and accounting
document {ACCOUNTINGDOCUMENT}
"""
user_prompt = f"""
explain why the bank statement is matched with the open
invoices?
"""
prompt = [{"role": "system", "content": context}, {"role":
"user", "content": user_prompt}]
response = get_completion(prompt)
```

The explanation text output by the LLM system 416 provides a description as to why the type of match (e.g., none, single, multi) indicated in the inference result 424 was predicted for the input pair, namely the query entity 420 and the target entity 422. In some examples, the explanation text is provided to the result groundtruth validator 446 and is used to determine whether the inference result 424 is correct as groundtruth validation. In some examples, the inference result 424 is evaluated by a user (e.g., a domain expert) with help of the explanation. For example, the explanation can indicate that matching is based on amount, country, posting date, etc. If these attributes are reasonably usable to match items, then it can be determined that the inference result 424 is accurate. If the explanation only indicates that the amount is matched, then it is likely that the inference result 424 is inaccurate, as there are possibly other invoice items having the same amount.

The correctness result is feedback to the inference accuracy module 448, which calculates an accuracy score. In some examples, the accuracy score is calculated based on a number of correctness results (a batch). For example, the correctness (e.g., correct, not correct) of the inference result 424 can be added to a set of correctnesses of previous inference results, and an accuracy can be determined based thereon (e.g., a ratio of a number of correct inference results to a total number of inference results in the batch).

The accuracy score is provided to the ML model accuracy module 450, which compares the accuracy score to an accuracy benchmark that is determined from historical accuracies recorded in the ML model accuracy records store 454. In some examples, it is determined whether there is a threshold decrease in accuracy. For example, a difference between the accuracy score and the accuracy benchmark can be determined and, if the difference exceeds a threshold difference, it is determined that there is a threshold decrease in accuracy. Here, the difference can be considered an accuracy metric.

In some implementations, if there is not a threshold decrease in accuracy, the inference runtime 402 continues inference with the current ML model 430. That is, if there is not a threshold decrease in accuracy, neither fine-tuning, nor re-training is performed. If there is a threshold decrease in accuracy, the ML model evaluation module 440 considers the data pattern change to determine whether re-training or fine-tuning of the ML model is to be performed. In some examples, the ML model evaluation system 440 compares the data pattern change to a threshold data pattern change to determine whether a sufficient change in the data pattern is present. For example, if there is a threshold decrease in accuracy and a sufficient data pattern change, fine-tuning of the ML model is performed. As another example, if there is a threshold decrease in accuracy, but not a sufficient data pattern change, re-training of the ML model is performed.

If re-training or fine-tuning of the ML models is to be performed, the query entity and target entity pairs are retrieved from the data storage system 408 and are used as training data for re-training or fine-tuning of the ML model by the ML model adjustment module 442. After re-training or fine-tuning, the (updated) ML model is deployed to the inference runtime 402.

In some examples, fine-tuning can include freezing a first sub-set of parameters (weights) of the ML model and training the ML model on a sub-set of training data to adjust non-frozen parameters in a second sub-set of parameters of the ML model over multiple iterations. In some examples, the sub-set of training data is provided as query entity and target entity pairs retrieved from the data storage system 408. In some examples, the sub-set of training data includes the latest query entity and target entity pairs that had been processed for inference (e.g., query entity and target entity pairs received in the last X hours, days, weeks, months), as well as the respective inference results.

In some examples, re-training can include initializing parameters of the ML model and adjusting all parameters of the ML model over multiple iterations of training using a set of training data. That is, during re-training, the parameters are initialized and no parameters are frozen. In some examples, the set of training data is provided as all query entity and target entity pairs stored in the data storage system 408, and the respective inference results.

Figure 5:
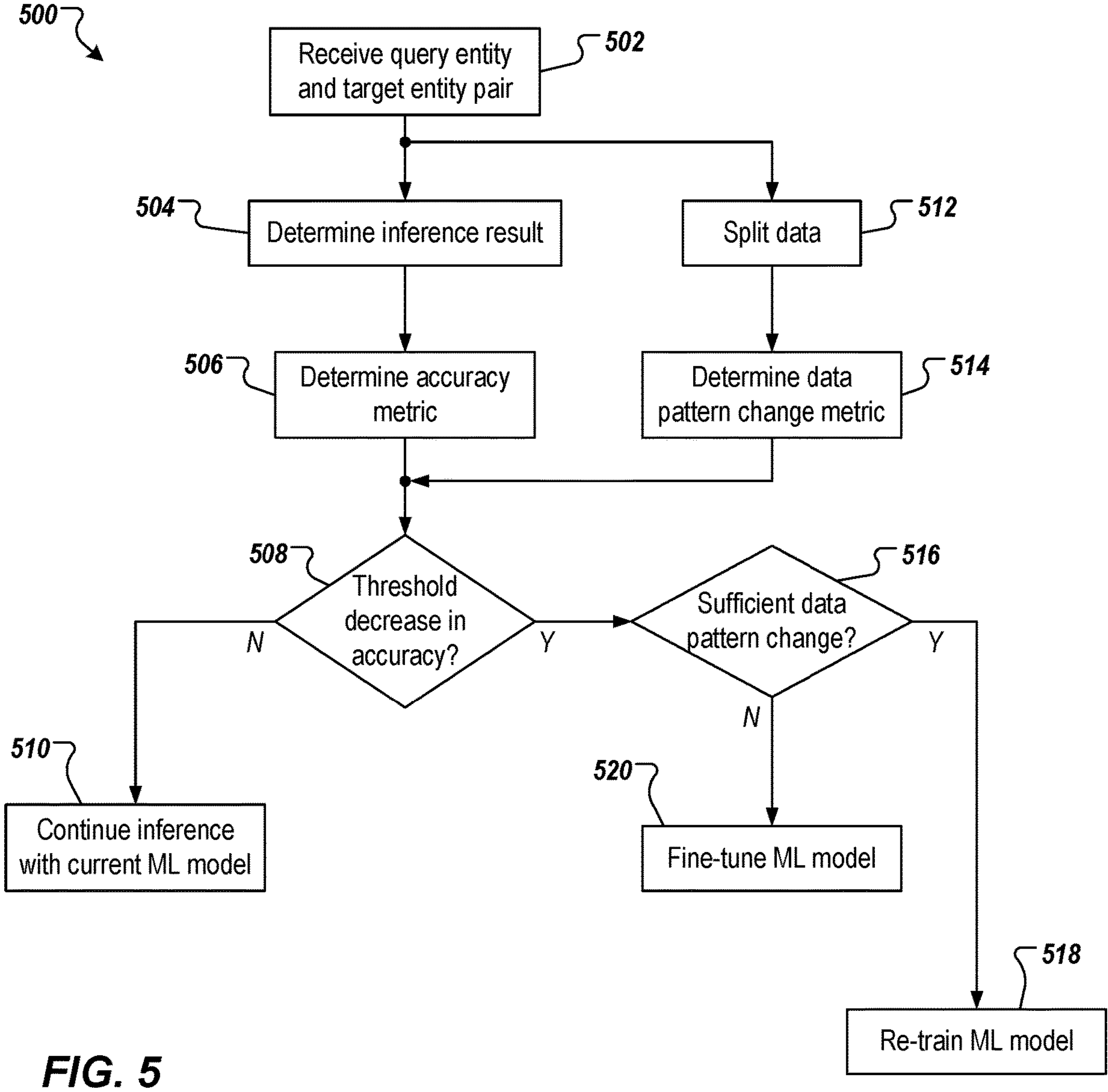
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices.

A query entity and a target entity pair are received (502). For example, and as described in detail herein with reference to FIG. 4, the inference system receives a query entity 420 and a target entity 422, and the data storage system receives the query entity 420 and the target entity 422. Each query entity and target entity pair (e.g., the query entity 420, the target entity 422) is stored as inference data in the query entity and target entity store 452 of the data storage system 408. An inference result is determined (504). For example, and as described in detail herein, the inference system 402 executes a ML model 430 that determines the inference result 424 based on the query entity 420 and the target entity 422.

An accuracy metric is determined (506). For example, and as described in detail herein, the inference result 424 provided by the inference runtime 402 is used as context to generate an explanation prompt by the explanation prompt generator 444, which is input to the LLM system 416 to provide explanation text. The explanation text is provided to the result groundtruth validator 446 and is used to determine whether the inference result 424 is correct as groundtruth validation. That is, a correctness result (e.g., inference result is correct, inference result is incorrect) is determined and is feedback to the inference accuracy module 448, which calculates an accuracy score that is provided to the ML model accuracy module 450.

It is determined whether there is a threshold decrease in accuracy (508). For example, and as described in detail herein, the accuracy score is compared to an accuracy benchmark that is determined from historical accuracies recorded in the ML model accuracy records store 454. If a difference between the accuracy score and the accuracy benchmark exceeds a threshold difference, it is determined that there is a threshold decrease in accuracy. Here, the difference can be considered an accuracy metric. If there is not a threshold decrease in accuracy, inference continues with the ML model (510).

Data is split (512). For example, and as described in detail herein, the data recorded in each of the query entity 420 and the target entity 422 are split into structured data and unstructured data by the data split module 458 of the data exploration system 410. The structured data is processed by the data pattern exploration module 460 to generate a data pattern vector, which is provided as a multi-dimensional vector of numbers that represent a data pattern of the structured data. In some examples, the data pattern vector is generated by processing the structured data through an embedder that outputs the data pattern vector.

A data pattern change metric is determined (514). For example, and as described in detail herein, the structured data is processed by the data pattern exploration module 460 to generate a data pattern vector (also referred to as a data pattern embedding), and the unstructured data is used to generate context for a detection prompt by the detection prompt generator 462 of the data pattern detection system 412. The LLM system 416 processes the detection prompt and generates an output that is responsive to the detection prompt. The output is processed (e.g., by an embedder) to provide a data pattern vector that is compared to a summary data pattern vector to provide a data pattern change, which can be considered a data pattern metric. The data pattern change is input to the ML model adaptation system 404.

If there is a threshold decrease in accuracy, it is determined whether there is a sufficient data pattern change (516). For example, and as described in detail herein, the ML model evaluation system 440 compares the data pattern change to a threshold data pattern change to determine whether a sufficient change in the data pattern is present. If there is not a sufficient data pattern change, the ML model is retrained (518), as described in detail herein. If there is a sufficient data pattern change, the ML model is fine-tuned (520), as described in detail herein. The fine-tuned or re-trained ML model is deployed to the inference runtime 402 to generate inference results for subsequent query entity and target entity pairs.

Implementations of the present disclosure provide one or more technical advantages. For example, and as described herein, implementations of the present disclosure provide an automatic ML model adaptation mechanism for ML-based decision systems, which enables ML models to automatically be evaluated and fine-tuned or re-trained in real-time. Traditional approaches require non-real-time, offline data analysis to be performed by data scientists, who analyze the data and the ML model outcomes to determine whether re-training of the ML model is required, for example. This presents multiple disadvantages including expending technical resources and time, during which the ML model cannot be used (e.g., at risk of automated decisions in response to inaccurate inference), bringing operations relying on the inference results to a halt. As described herein, implementations of the present disclosure provide for real-time, online evaluation of accuracy and data pattern changes for selective and automatic triggering of fine-tuning or re-training. Further, implementations of the present disclosure provide combined metrics of ML model accuracy and data pattern change used for decision of model re-training or fine-tuning. This combination of metrics ensures ML model re-training or fine-tuning responsive to the actual situation. Fine-tuning is triggered when ML model performance is dropped due to the latest data change from the application. If the data pattern has not changed to a sufficient degree, but accuracy of the ML model has, this indicates that the relation of data attributes may has changed. Consequently, re-training of the ML model is triggered.

Figure 6:
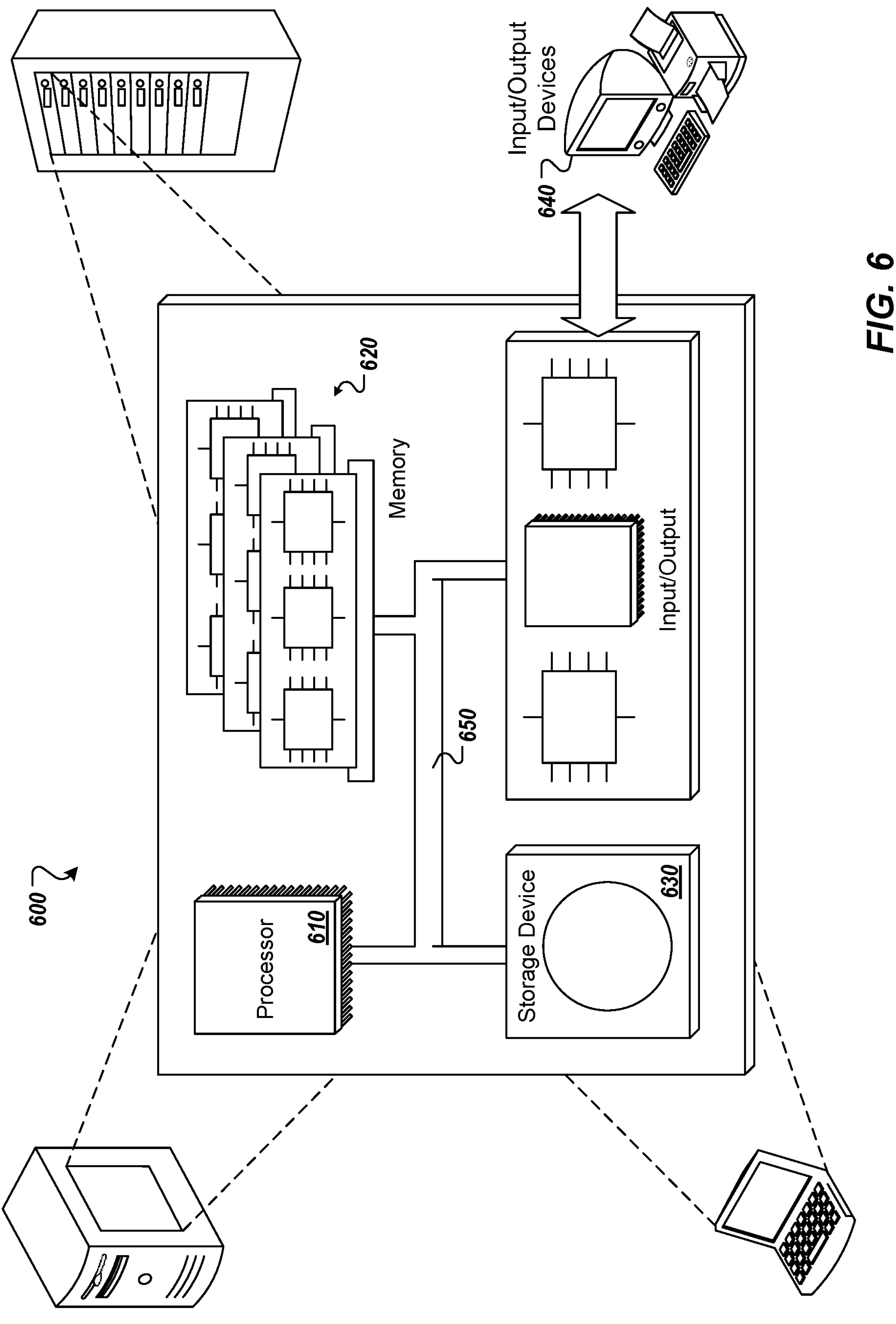
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for real-time monitoring of performance of a ML model and selectively triggering one of fine-tuning and re-training of the machine learning (ML) model, the method being executed by one or more processors and comprising:

receiving a query entity and target entity pair that are input to the ML model, the ML model being trained to match query entities of a set of query entities to target entities of a set of target entities;

receiving an inference result output from the ML model, the inference result comprising a type of match between a query entity and a target entity of the query entity and target entity pair;

generating a detection prompt at least partially based on unstructured data determined from one or more of the query entity and the target entity;

determining a data pattern vector that is representative of an output of a large language model (LLM) that is responsive to the detection prompt, the data pattern vector being determined by:

splitting each of the query entity and the target entity into structured data and unstructured data, and processing the structured data through an embedder that outputs the data pattern vector as a multi-dimensional vector of numbers;

providing a data pattern metric based on the data pattern vector;

generating an explanation prompt at least partially based on the inference result;

determining a correctness result that is representative of a correctness of the inference result using explanation text that is generated by the LLM and is responsive to the explanation prompt;

in response to determining that there is a threshold decrease in accuracy at least partially based on the correctness result, automatically executing one of fine-tuning of the ML model and re-training of the ML model responsive to the data pattern metric to provide an adapted ML model; and deploying the adapted ML model for inference.

2. The method of claim 1, wherein fine-tuning of the ML model is triggered in response to determining that there is a sufficient data pattern change based on the data pattern metric.

3. The method of claim 1, wherein re-training of the ML model is triggered in response to determining that there is not a sufficient data pattern change based on the data pattern metric.

4. The method of claim 1, wherein providing a data pattern metric comprises comparing the data pattern vector to a summary data pattern vector.

5. The method of claim 1, wherein determining that there is a threshold decrease in accuracy comprises:

determining an accuracy based on the correctness result and historical correctness results; and comparing the accuracy to a benchmark accuracy.

6. The method of claim 1, wherein each of the detection prompt and the explanation prompt is provided as a few-shot prompt.

7. The method of claim 1, wherein fine-tuning is performed using a sub-set of query entity and target entity pairs previously used for inference, and re-training is performed using an entirety of query entity and target entity pairs previously used for inference.

8. A non-transitory computer-readable storage medium coupled to one or more processors and having instructions stored thereon which, when executed by the one or more processors, cause the one or more processors to perform operations for real-time monitoring of performance of a machine learning (ML) model and selectively triggering one of fine-tuning and re-training of the ML model, the operations comprising:

receiving a query entity and target entity pair that are input to the ML model, the ML model being trained to match query entities of a set of query entities to target entities of a set of target entities;

receiving an inference result output from the ML model, the inference result comprising a type of match between a query entity and a target entity of the query entity and target entity pair;

generating a detection prompt at least partially based on unstructured data determined from one or more of the query entity and the target entity;

determining a data pattern vector that is representative of an output of a large language model (LLM) that is responsive to the detection prompt, the data pattern vector being determined by:

splitting each of the query entity and the target entity into structured data and unstructured data, and processing the structured data through an embedder that outputs the data pattern vector as a multi-dimensional vector of numbers;

providing a data pattern metric based on the data pattern vector;

generating an explanation prompt at least partially based on the inference result;

determining a correctness result that is representative of a correctness of the inference result using explanation text that is generated by the LLM and is responsive to the explanation prompt;

in response to determining that there is a threshold decrease in accuracy at least partially based on the correctness result, automatically executing one of fine-tuning of the ML model and re-training of the ML model responsive to the data pattern metric to provide an adapted ML model; and deploying the adapted ML model for inference.

9. The non-transitory computer-readable storage medium of claim 8, wherein fine-tuning of the ML model is triggered in response to determining that there is a sufficient data pattern change based on the data pattern metric.

10. The non-transitory computer-readable storage medium of claim 8, wherein re-training of the ML model is triggered in response to determining that there is not a sufficient data pattern change based on the data pattern metric.

11. The non-transitory computer-readable storage medium of claim 8, wherein providing a data pattern metric comprises comparing the unstructured data pattern vector to an existing unstructured data pattern vector.

12. The non-transitory computer-readable storage medium of claim 8, wherein determining that there is a threshold decrease in accuracy comprises:

determining an accuracy based on the correctness result and historical correctness results; and comparing the accuracy to a benchmark accuracy.

13. The non-transitory computer-readable storage medium of claim 8, wherein each of the detection prompt and the explanation prompt is provided as a few-shot prompt.

14. The non-transitory computer-readable storage medium of claim 8, wherein fine-tuning is performed using a sub-set of query entity and target entity pairs previously used for inference, and re-training is performed using an entirety of query entity and target entity pairs previously used for inference.

15. A system, comprising:

a computing device; and a computer-readable storage device coupled to the computing device and having instructions stored thereon which, when executed by the computing device, cause the computing device to perform operations for real-time monitoring of performance of a machine learning (ML) model and selectively triggering one of fine-tuning and re-training of the ML model, the operations comprising:

receiving a query entity and target entity pair that are input to the ML model, the ML model being trained to match query entities of a set of query entities to target entities of a set of target entities;

receiving an inference result output from the ML model, the inference result comprising a type of match between a query entity and a target entity of the query entity and target entity pair;

generating a detection prompt at least partially based on unstructured data determined from one or more of the query entity and the target entity;

determining a data pattern vector that is representative of an output of a large language model (LLM) that is responsive to the detection prompt, the data pattern vector being determined by:

splitting each of the query entity and the target entity into structured data and unstructured data, and processing the structured data through an embedder that outputs the data pattern vector as a multi-dimensional vector of numbers;

providing a data pattern metric based on the data pattern vector;

generating an explanation prompt at least partially based on the inference result;

determining a correctness result that is representative of a correctness of the inference result using explanation text that is generated by the LLM and is responsive to the explanation prompt;

in response to determining that there is a threshold decrease in accuracy at least partially based on the correctness result, automatically executing one of fine-tuning of the ML model and re-training of the ML model responsive to the data pattern metric to provide an adapted ML model; and deploying the adapted ML model for inference.

16. The system of claim 15, wherein fine-tuning of the ML model is triggered in response to determining that there is a sufficient data pattern change based on the data pattern metric.

17. The system of claim 15, wherein re-training of the ML model is triggered in response to determining that there is not a sufficient data pattern change based on the data pattern metric.

18. The system of claim 15, wherein providing a data pattern metric comprises comparing the unstructured data pattern vector to an existing unstructured data pattern vector.

19. The system of claim 15, wherein determining that there is a threshold decrease in accuracy comprises:

determining an accuracy based on the correctness result and historical correctness results; and comparing the accuracy to a benchmark accuracy.

20. The system of claim 15, wherein each of the detection prompt and the explanation prompt is provided as a few-shot prompt.

* * * * *